United States Patent
Kim et al.

(10) Patent No.: US 9,400,346 B2
(45) Date of Patent: Jul. 26, 2016

(54) MANUFACTURING METHOD OF REFLECTIVE POLARIZER PLATE AND DISPLAY DEVICE INCLUDING THE SAME

(71) Applicant: Samsung Display Co., Ltd., Yongin, Gyeonggi-Do (KR)

(72) Inventors: Tae-Woo Kim, Yongin (KR); Cheol-Kyu Kim, Yongin (KR); Min Kang, Yongin (KR); Min-Hyuck Kang, Yongin (KR); Bong-Yeon Kim, Yongin (KR); Seung-Won Park, Yongin (KR); Moon-Gyu Lee, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/572,937

(22) Filed: Dec. 17, 2014

(65) Prior Publication Data

US 2015/0226897 A1    Aug. 13, 2015

(30) Foreign Application Priority Data

Feb. 7, 2014    (KR) ......................... 10-2014-0014167

(51) Int. Cl.
*G02B 5/30* (2006.01)
*B82Y 20/00* (2011.01)

(52) U.S. Cl.
CPC ............ *G02B 5/3058* (2013.01); *G02B 5/3041* (2013.01); *B82Y 20/00* (2013.01); *Y10S 977/762* (2013.01)

(58) Field of Classification Search
CPC  G02B 5/3058; G02B 5/3041; Y10S 977/762; B82Y 20/00

USPC ................................ 359/485.05, 487.03, 900
See application file for complete search history.

(56) References Cited

U.S. PATENT DOCUMENTS

| | | | |
|---|---|---|---|
| 8,081,273 B2 | 12/2011 | Choo et al. | |
| 8,587,751 B2 | 11/2013 | Kim et al. | |
| 2010/0302481 A1* | 12/2010 | Baum ............... | B29D 11/00634 349/96 |
| 2010/0328768 A1* | 12/2010 | Lines .................. | G02B 5/0252 359/485.05 |
| 2013/0077164 A1* | 3/2013 | Davis .................. | G02B 5/3058 359/485.05 |
| 2013/0126468 A1 | 5/2013 | Kim et al. | |
| 2014/0140045 A1* | 5/2014 | Sohn ....................... | F21V 13/08 362/97.1 |

FOREIGN PATENT DOCUMENTS

| | | |
|---|---|---|
| JP | 2009169213 A | 7/2009 |
| JP | 2010210824 A | 9/2010 |
| JP | 2011039351 A | 2/2011 |
| JP | 2012103468 A | 5/2012 |
| KR | 10-0512141 B1 | 8/2005 |
| KR | 1020110120718 A | 11/2011 |
| KR | 10-1222566 B1 | 1/2013 |

* cited by examiner

*Primary Examiner* — Frank Font
(74) *Attorney, Agent, or Firm* — Cantor Colburn LLP

(57) ABSTRACT

A display device includes a reflective polarizer plate including a first substrate defining an opening area and a non-opening area, and a wire grid polarizer which is disposed on a surface of the first substrate and includes a polarizing part including a plurality of nano wire patterns which is arranged in the opening area to be spaced apart from each other, and a reflecting part including a metal film provided in the non-opening area.

13 Claims, 8 Drawing Sheets

MANUFACTURING METHOD OF REFLECTIVE POLARIZER PLATE AND DISPLAY DEVICE INCLUDING THE SAME

This application claims priority to Korean Patent Application No. 10-2014-0014167, filed on Feb. 7, 2014, and all the benefits accruing therefrom under 35 U.S.C. §119, the entire contents of which are incorporated herein by reference in their entirety.

BACKGROUND

1. Field

The invention relates to a method of manufacturing a reflective polarizer plate and a display device having the reflective polarizer plate.

2. Description of the Related Art

Generally, metallic wires arranged in a period shorter than a wavelength of incident electromagnetic waves selectively transmit or reflect polarized light of the electromagnetic waves. By using such a phenomenon, it is possible to manufacture a polarizer that has excellent polarization efficiency, high transmissivity and a wide viewing angle. Such a polarizer is referred to as a Wire Grid Polarizer.

SUMMARY

Accordingly, an object of the invention is intended to provide a method of manufacturing a reflective polarizer plate using a wire grid polarizer and a display device having the reflective polarizer plate, and, more particularly, to a method of manufacturing a reflective polarizer plate and a display device having the reflective polarizer plate, which are capable of improving reflection efficiency and reducing the number of masks.

An exemplary embodiment of the invention provides a method of manufacturing a reflective polarizer plate including sequentially providing a metal layer, a first barrier layer and a sacrificial layer on a substrate defining an opening area and a non-opening area, providing a plurality of first photo mask patterns, each having a first height and spaced apart from each other, on the sacrificial layer of the opening area, and providing a second photo mask pattern on the sacrificial layer of the non-opening area, the second photo mask pattern having a second height that is greater than the first height, providing a plurality of sacrificial layer patterns by selectively etching the sacrificial layer of the opening area using the plurality of first photo mask patterns and the second photo mask pattern as a mask, removing the plurality of first photo mask patterns, and removing only a portion of the second photo mask pattern, providing a second barrier layer on the substrate on which the plurality of sacrificial layer patterns is provided, providing a plurality of first barriers provided along sidewalls of the plurality of sacrificial layer patterns by anisotropically etching the second barrier layer, and thereafter selectively removing only the plurality of sacrificial layer patterns of the opening area, providing a plurality of grid patterns spaced apart from each other, by providing a copolymer layer in a grid pattern area corresponding to a space between the plurality of first barriers and then performing patterning, and providing a wire grid polarizer having a plurality of nano wire patterns arranged in the opening area to be spaced apart from each other, and a metal film in the non-opening area, by performing patterning on the metal layer of the opening area using the plurality of grid patterns.

In an exemplary embodiment of the invention, the second photo mask pattern may have a width corresponding to an associated non-opening area.

In another exemplary embodiment of the invention, the metal film may be provided in a closed type to have a width corresponding to the second photo mask pattern.

In yet another exemplary embodiment of the invention, in the providing the plurality of first photo mask patterns and the second photo mask pattern, the photo mask patterns first photo mask patterns and the second photo mask pattern may be provided through a single mask process using a half-tone mask or a slit mask.

In a still further exemplary embodiment of the invention, the providing the metal layer, the first barrier layer and the sacrificial layer may further include at least one of providing a first hard mask layer between the first barrier layer and the sacrificial layer, and providing a second hard mask layer on the sacrificial layer.

In an additional exemplary embodiment of the invention, the method may further include providing second hard mask patterns by selectively etching the second hard mask layer of the opening area using the first and second photo mask patterns, before providing the plurality of sacrificial layer patterns.

In another exemplary embodiment of the invention, the method may further include, between the removing the plurality of first photo mask patterns and the portion of the second photo mask pattern and the providing the second barrier layer, removing the second hard mask patterns of the opening area, and removing the second photo mask pattern that remains on the non-opening area, where the second barrier layer may be provided to cover the second hard mask pattern remaining on the plurality of sacrificial layer pattern of the non-opening area and the plurality of sacrificial layer patterns of the opening area.

In another exemplary embodiment of the invention, in the selectively removing the plurality of sacrificial layer patterns of the opening area, upper portions of the plurality of sacrificial layer patterns of the non-opening area may be masked by the second hard mask pattern.

In another exemplary embodiment of the invention, the method may further include, between the providing the plurality of first barriers and the providing the grid patterns, providing second barriers by performing patterning on the first hard mask layer using the plurality of first barriers as the mask, and providing third barriers by performing patterning on the first barrier layer using the second barriers as the mask.

In another exemplary embodiment of the invention, the providing the grid patterns may include filling the copolymer layer between the third barriers to a height that is lower than the third barriers, phase-separating the copolymer layer into first and second polymers by thermally treating the copolymer layer such that the first and second polymers are alternately arranged, and providing the plurality of grid patterns spaced apart from each other by a predetermined distance, between the third barriers, by removing either of the first and second polymers.

In another exemplary embodiment of the invention, at the providing the wire grid polarizer, the metal layer of the opening area may be subjected to patterning, using the grid patterns as well as the third barriers, as the mask In another exemplary embodiment of the invention, the nano wire patterns may be subjected to patterning to have a width of about 200 nanometers (nm) or less.

In another exemplary embodiment of the invention, at least some of the nano wire patterns may be subjected to patterning to have a width ranging from about 50 nm to about 60 nm.

Another exemplary embodiment of the invention provides a display device including a reflective polarizer plate, including a first substrate defining an opening area and a non-opening area, and a wire grid polarizer disposed on a surface of the first substrate, where the wire grid polarizer includes a polarizing part including a plurality of nano wire patterns that are arranged in the opening area to be spaced apart from each other, and a reflecting part including a metal film provided in the non-opening area.

In another exemplary embodiment of the invention, the display device may further include a second substrate provided on the first substrate on which the reflective polarizer plate is provided, and a plurality of pixels disposed between the first and second substrates.

In another exemplary embodiment of the invention, the first substrate and the second substrate may constitute a lower substrate and an upper substrate of a display panel, respectively, and the wire grid polarizer may be directly disposed on the first substrate to be integrated with the display panel in an In-Cell type.

In another exemplary embodiment of the invention, the metal film constituting the reflecting part may be a closed type metal film.

In another exemplary embodiment of the invention, the display device may further include a thin film on the metal film.

In another exemplary embodiment of the invention, the nano wire patterns may respectively have a width of about 200 nm or less.

In another exemplary embodiment of the invention, the nano wire patterns may be arranged to be spaced apart from each other at a distance ranging from about 50 nm to about 60 nm, and at least some of the nano wire patterns may have a width ranging from about 50 nm to about 60 nm.

BRIEF DESCRIPTION OF THE DRAWINGS

The above and other exemplary embodiments, advantages and features of this disclosure will now be described more fully hereinafter with reference to the accompanying drawings, in which.

DETAILED DESCRIPTION

Figure 1:
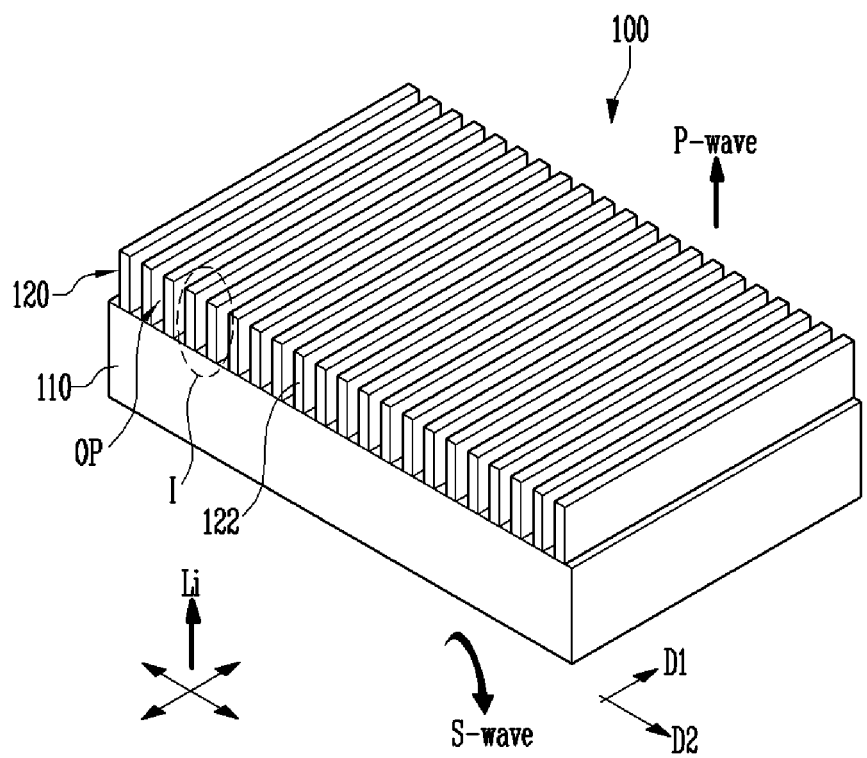
FIG. 1 is a perspective view schematically illustrating an exemplary embodiment of a reflective polarizer plate according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the exemplary embodiment of the invention will be described in detail with reference to the accompanying drawings. It should also be understood that the description is for illustrative purposes only, but is not limited to the exemplary embodiment shown in the appended drawings.

Figure 2:
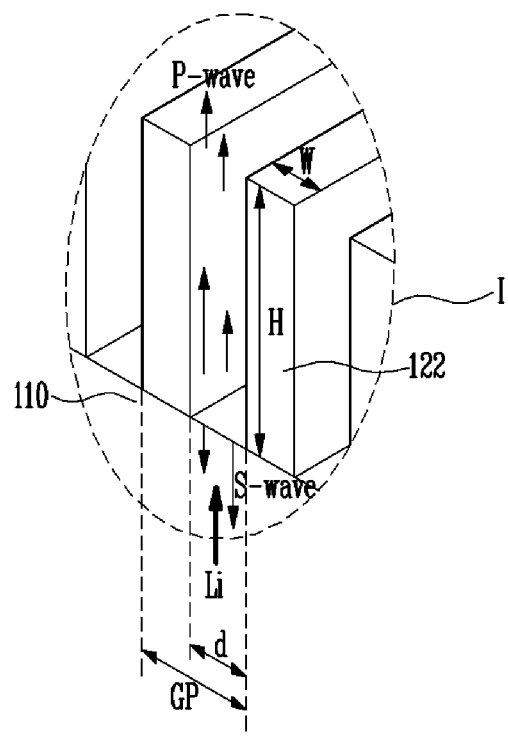
FIG. 2 is an enlarged view illustrating portion I encircled in FIG. 1.

FIG. 1 is a perspective view schematically illustrating a reflective polarizer plate according to an exemplary embodiment of the invention. FIG. 2 is an enlarged view illustrating portion I encircled in FIG. 1.

Referring to FIGS. 1 and 2, the reflective polarizer plate 100 according to the exemplary embodiment of the invention includes a substrate 110, and a wire grid polarizer 120 provided on the substrate 110.

The substrate 110 includes a transparent substrate through which light may be transmitted. In an exemplary embodiment, the substrate 110 may be a transparent silicon or glass substrate, for example. In this context, a term "transparent" means that it comprehensively embraces 100 percent (%) transparency as well as translucency that satisfies a predetermined level of transmittance under given design conditions.

The wire grid polarizer 120 is configured to include a plurality of nano wire patterns 122 that extend to be long in a first direction D1 and are arranged to be spaced apart from each other in a second direction D2 crossing the first direction D1. In an exemplary embodiment, the first direction D1 may be perpendicular to the second direction D2, and the nano wire patterns 122 may be arranged to be parallel to and spaced apart from each other by a predetermined distance in the second direction D2.

An opening OP is defined between adjacent nano wire patterns 122.

The nano wire patterns 122 may include metallic nano wire patterns. In an exemplary embodiment, the nano wire patterns 122 may include aluminum (Al), gold (Au), chromium (Cr), silver (Ag), copper (Cu), nickel (Ni), iron (Fe), and cobalt (Co), or alloy thereof. In an exemplary embodiment, the nano wire patterns 122 may be metallic nano wire patterns including aluminum (Al), for example.

When the wire grid polarizer 120 is provided such that the nano wire patterns 122 have a grating period GP of a submicron unit that is shorter than the incident wavelength of light Li, especially the incident wavelength of visible rays, the incident light Li is polarized while passing through the wire grid polarizer 120.

To this end, the nano wire patterns 122 may undergo patterning to have the grating period GP of the submicron unit, using various techniques, such as Photo Lithography, Hologram Lithography, E-beam Lithography, Lift-Off, Sputtering, Nano Imprinting, or Block Copolymer Nano Patterning (hereinafter, referred to as BCP patterning).

Among the various techniques, the BCP patterning utilizes the properties of self-assembly of the block copolymer, and thus is particularly advantageous for a large-area process employed to manufacture a display panel.

Although not shown FIGS. 1 and 2, in an exemplary embodiment, the reflective polarizer plate 100 according to the exemplary embodiment may further include a protective layer that covers the upper portions of the nano wire patterns 122.

As mentioned above, the polarization properties and efficiency of the reflective polarizer plate 100 may vary depending on the width W, the height H, or the grating period GP of the nano wire patterns 122.

To be more specific, when the nano wire patterns 122 of the wire grid polarizer 120 are arranged to have the grating period GP that is shorter than the wavelength of the visible rays, for example, about 400 nanometers (nm) or less, the wire grid polarizer 120 polarizes the incident light Li. In an exemplary embodiment, among the incident light Li, P waves transmit the wire grid polarizer 120, and S waves are reflected by the wire grid polarizer 120.

Particularly, when the nano wire patterns 122 are finely patterned and are arranged to have a short grating period GP that is approximately 200 nm or less, for example, about 100 nm or less, the diffraction of light can be effectively prevented, in addition to providing excellent polarization properties.

By such a polarization principle, the reflective polarizer plate 100 having the wire grid polarizer 120 substitutes for an absorption-type polarizer plate in a film form, so that it may be applied to a liquid crystal display device or the like.

In an exemplary embodiment of the invention, a ratio of the width W to the height H of each of the nano wire patterns 122 may be set to be one to three or more. In an exemplary embodiment, the width W of each nano wire pattern 122 may be set to be about 60 nm or less, and the height H may be set to be about 150 nm or more. However, the invention is not limited to the above-mentioned values. In an exemplary embodiment, the width W of each nano wire pattern 122 may be freely set in a range of about 200 nm or less, and the height H may be set to be approximately three or more times the width W.

Further, the grating period GP of the nano wire patterns 122 may be set to be equal to or less than the wavelength of the visible rays, about 400 nm or less, e.g. about 200 nm or less. Particularly, when the nano wire patterns 122 are finely patterned and arranged to have the grating period GP of about 100 nm or less, it is possible to provide excellent polarization properties.

A distance d between neighboring nano wire patterns 122 may be set to be approximately similar to the width W of each nano wire pattern 122.

In an exemplary embodiment, the distance d between the nano wire patterns 122 may be set to be in a range from about 50 nm to about 400 nm, for example. When the distance d between the nano wire patterns 122 is less than about 50 nm and thus narrow, polarization effect is generated mainly in an ultraviolet ("UV") range, and a careful manufacturing process is required, so that productivity is reduced. When the distance d exceeds about 400 nm, polarization properties are insufficient and the polarization effect is generated mainly in an infrared range.

Particularly, in order to provide excellent polarization properties, the distance d between the nano wire patterns 122 may be set to be about 60 nm or less, for example, in a range from about 50 nm to about 60 nm. In this case, the width W of each nano wire pattern 122 may be set to be approximately equal to the distance d between the nano wire patterns 122, for example, in a range from about 50 nm to about 60 nm.

In the case of adopting the above-mentioned reflective polarizer plate 100, resistance to deterioration is increased as compared to the absorption-type polarizer plate, and the above-mentioned reflective polarizer plate 100 may be directly disposed on a lower substrate of a display panel to be integrated with the display panel in an In-Cell type and thereby is advantageous for thinness.

Further, in the case of adopting the reflective polarizer plate 100, light reflected by the reflective polarizer plate 100 is used, thus enhancing light efficiency.

In an exemplary embodiment, after the S-wave component reflected by the reflective polarizer plate 100 is scattered by a light guide plate provided on a backlight unit (not shown) under the reflective polarizer plate 100 and polarizability is cancelled out, the component is reflected again by a reflecting plate provided on the backlight unit, so that the component is re-incident into the reflective polarizer plate 100, for example. Such a process may be repeated, thus enhancing light efficiency.

When light efficiency is improved as such, a reduction in power consumption and/or improvement on luminance is advantageously achieved.

Figure 3:
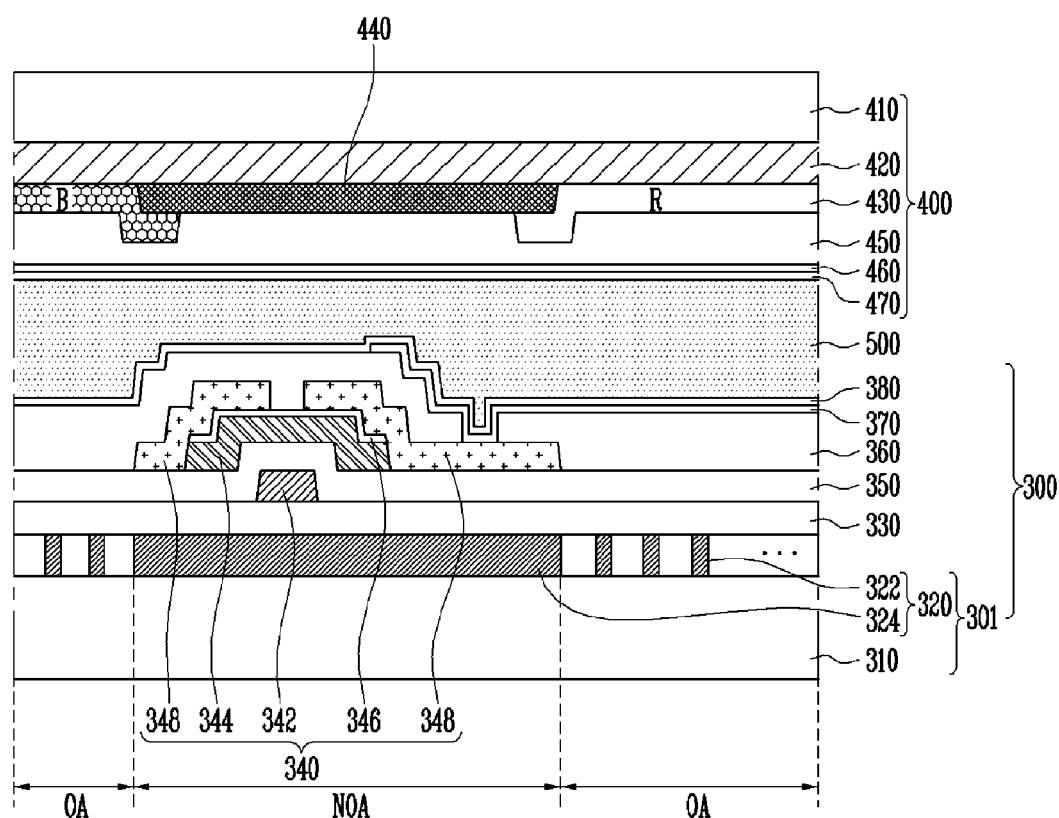
FIG. 3 is a sectional view illustrating an exemplary embodiment of parts of a display device having the reflective polarizer plate according to the invention.

FIG. 3 is a sectional view illustrating parts of a display device having the reflective polarizer plate according to an exemplary embodiment of the invention. FIG. 3 illustrates the liquid crystal display device having the lower reflective polarizer plate integrated with the display panel in the In-Cell type, as the exemplary embodiment of the invention, but the display device of the invention is not necessarily limited thereto. In an exemplary embodiment, a display device having a reflective polarizer plate according to another embodiment of the invention may be a display device having a separate-type upper and/or lower reflective polarizer plate, and the display device may be a different type of display device, such as an organic electroluminescent display device.

Referring to FIG. 3, the display device according to the exemplary embodiment of the invention is provided with a reflective polarizer plate 301 including a first substrate 310 that defines an opening area OA and a non-opening area NOA, and a wire grid polarizer 320 that is disposed on a surface of the first substrate 310. The opening area OA is an area through which light is transmitted, while the non-opening area NOA is an area on which a thin film transistor ("TFT") 340 or wiring (not shown) is disposed. The non-opening area NOA prevents a pattern of the TFT 340 or wiring from being visible by a black matrix 440 located at an upper position.

In an exemplary embodiment, the first substrate 310 serving as a base material of the reflective polarizer plate 301 may be implemented to be integrated with a lower substrate of the display panel. In this case, the wire grid polarizer 320 may be directly disposed on the lower substrate (i.e. the first substrate 310) of the display panel to be integrated with the display panel in the In-Cell type. However, in another exemplary embodiment, the display device may be configured in the separate type where a separate lower substrate (not shown) is provided and the reflective polarizer plate 301 is provided under the lower substrate, without being limited to the above-mentioned configuration.

The wire grid polarizer 320 that is a substantial polarization layer of the reflective polarizer plate 301 includes a polarizing part and a reflecting part. The polarizing part includes a plurality of nano wire patterns 322 arranged on the opening area OA of the first substrate 310 in such a way as to be spaced apart from each other. The reflecting part is composed of a metal film 324 disposed on the non-opening area NOA of the first substrate 310.

In other words, the polarizing part and the reflecting part of the reflective polarizer plate 301 are defined to correspond to the opening area OA and the non-opening area NOA, respectively.

Here, as shown in FIG. 1, the polarizing part has a shape extending in the first direction D1, and a plurality of openings OP are arranged in the second direction D2 crossing the first direction D1. Further, the metal film 324 of the reflecting part is provided in a closed type having no opening.

In other words, metal patterns including the nano wire pattern 322 and the metal film 324 disposed on the polarizing part and the reflecting part are set in different widths. Particularly, the width of the metal film 324 is provided to be greater than the width of each nano wire pattern 322. In an exemplary embodiment, the width of the metal film 324 may be set to be approximately equal to the width of the associated non-opening area NOA, for example.

In an exemplary embodiment, the nano wire patterns 322 may undergo patterning to have the width of approximately 200 nm or less in view of a substantially small width, especially, considering polarization properties. Further, in the method of manufacturing the reflective polarizer plate 301 according to the exemplary embodiment of the invention that will be described in detail later, the nano wire patterns 322 may be provided to be spaced apart from each other in a substantially small distance from about 50 nm to about 60 nm. Some of the nano wire patterns 322 may undergo patterning to have a width which is in a range similar to the above-mentioned distance, that is, a substantially small width from about 50 nm to about 60 nm. Thus, the reflective polarizer plate 301 according to the exemplary embodiment of the invention can provide excellent polarization properties.

As such, when the polarizing part and the reflecting part are respectively provided on the opening area OA and the non-opening area NOA, it is advantageous in that it is possible to obtain a sufficient level of polarization properties in the opening area OA, and to enhance reflection efficiency, and thereby light efficiency in the non-opening area NOA is enhanced.

A first insulator film 330 is disposed on the first substrate 310 on which the wire grid polarizer 320 is disposed. The first insulator film 330 that includes a base insulator film completely covers the upper portion of the wire grid polarizer 320, thus serving as a protective film.

On the first insulator film 330, a pixel array including the TFT 340 and a pixel electrode 370 are disposed. In this regard, the TFT 340 and the pixel electrode 370 are disposed on the non-opening area NOA and the opening area OA on the first substrate 310, respectively.

The TFT 340 includes a gate electrode 342, source and drain electrodes 348. The TFT 340 further includes semiconductor layers 344 and 346 for providing a conduction channel between the source and drain electrodes 348 by a predetermined gate voltage supplied to the gate electrode 342.

Further, a second insulator film (also referred to as a gate insulator film) 350 is disposed between the gate electrode 342 and the semiconductor layers 344 and 346 of the TFT 340. In an exemplary embodiment, the second insulator film 350 may be provided on both of the pixel area including the opening area OA and the non-opening area NOA. In an exemplary embodiment, the second insulator film 350 may overlap whole portions of the opening area OA and the non-opening area NOA in a plan view.

On the thin film transistor 340, a third insulator film 360 on which the pixel electrode 370 is disposed.

The pixel electrode 370 is disposed at least on the opening area OA, and is electrically connected to the source or drain electrode 348 of the TFT 340 by a via hole defined through the third insulator film 360.

A lower oriented film 380 may be disposed on the pixel electrode 370. In an exemplary embodiment, the lower oriented film 380 may overlap a whole portion of the pixel electrode 370 in a plan view.

As described above, the reflective polarizer plate 301 including the first substrate 310, the TFT 340 disposed on the reflective polarizer plate 301 and the pixel electrode 370 constitute a TFT array substrate 300 of the display panel.

A color filter substrate 400 is placed on the TFT array substrate 300.

The color filter substrate 400 includes a second substrate 410 providing the upper substrate of the display panel, a color filter 430 disposed on a surface of the second substrate 410, a black matrix 440, an over-coating film 450 disposed on the second substrate 410 on which the color filter 430 and the black matrix 440 are provided, and a common electrode 460 disposed on a surface of the second substrate 410 on which the over-coating film 450 is disposed, in such a way to face the pixel electrode 370. In an exemplary embodiment, an over-coating film 450 may overlap a whole portion of the second substrate 410 in a plan view.

In an exemplary embodiment, the color filter 430 and the black matrix 440 may be provided to correspond to the opening area OA and the non-opening area NOA of the second substrate 410, respectively. In an exemplary embodiment, the common electrode 460 may be disposed on the pixel area and overlap a whole portion of the pixel area in a plan view.

The color filter substrate 400 may further include an upper polarizer plate 420 and/or an upper oriented film 470.

In an exemplary embodiment, the upper polarizer plate 420 may be provided between the color filter 430 and the second substrate 410 and/or between the black matrix 440 and the second substrate 410. According to an exemplary embodiment, the upper polarizer plate 420 may be configured to include the wire grid polarizer, like the reflective polarizer plate 301 serving as the lower polarizer plate.

A liquid crystal layer 500 is injected into a space between the TFT array substrate 300 and the color filter substrate 400. The TFT array substrate 300, the color filter substrate 400 and the liquid crystal layer 500 constitute the display panel of the liquid crystal display device.

Although only one area of the pixel is illustrated in FIG. 3 for convenience, a plurality of pixels including the TFT 340, the pixel electrode 370 and the common electrode 460 disposed on the respective pixel areas, may be disposed between the first and second substrates 310 and 410.

A backlight unit (not shown) is disposed under the display panel to supply light to the display panel, and light from the backlight unit is polarized by the wire grid polarizer 320 to be incident. Further, light from the display panel is polarized by the upper polarizer plate 420 to exit.

Since at least one reflective polarizer plate 301 is included in the exemplary embodiment of the invention, at least some of the light which does not transmit the reflective polarizer plate 301 but is reflected is used, thus increasing light efficiency. Particularly, in the exemplary embodiment of the invention, the closed metal film 324 is disposed on the non-opening area NOA, thus further enhancing reflection efficiency.

Figure 4A:
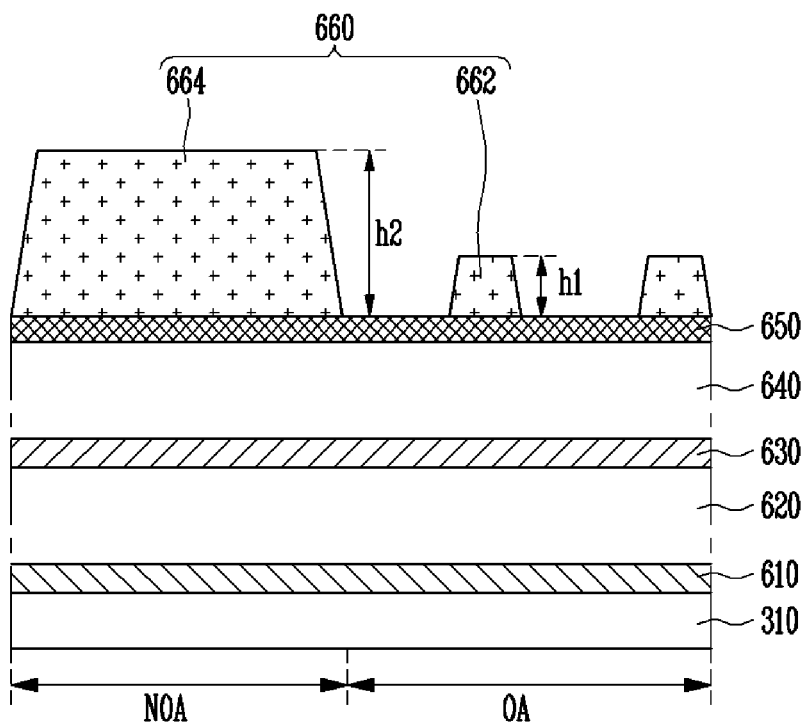
FIGS. 4A to 4N are sectional views sequentially illustrating an exemplary embodiment of a method of manufacturing a reflective polarizer plate according to the invention.
Figure 4B:
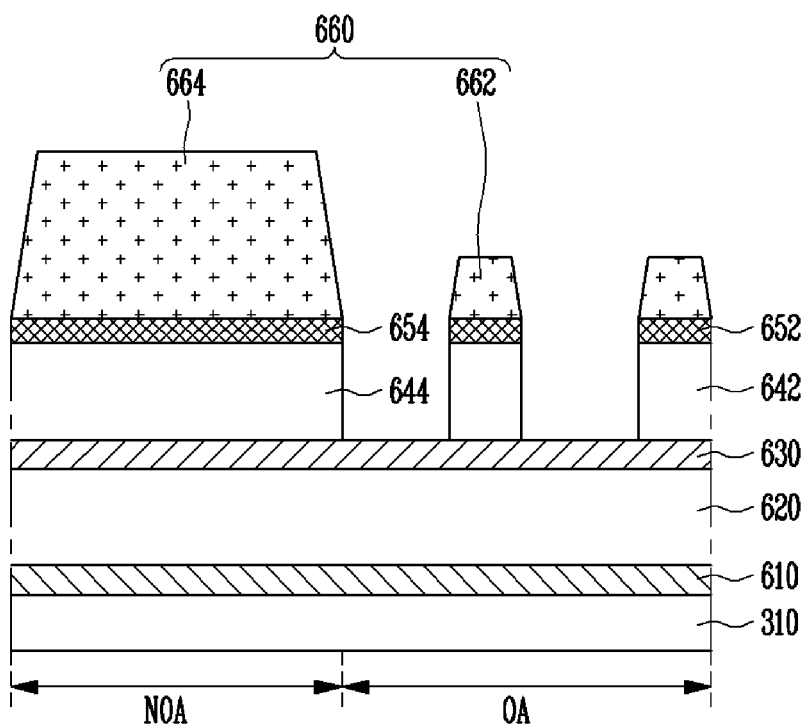
Figure 4C:
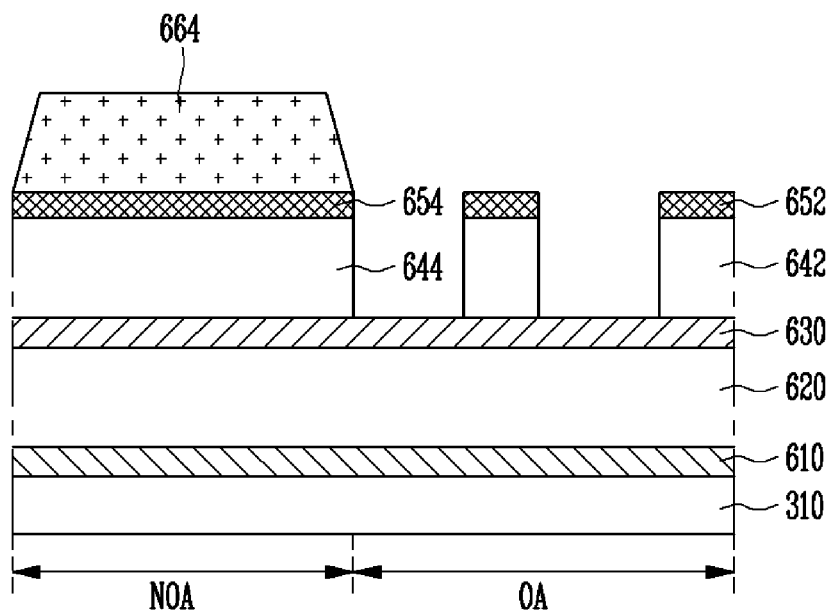
Figure 4D:
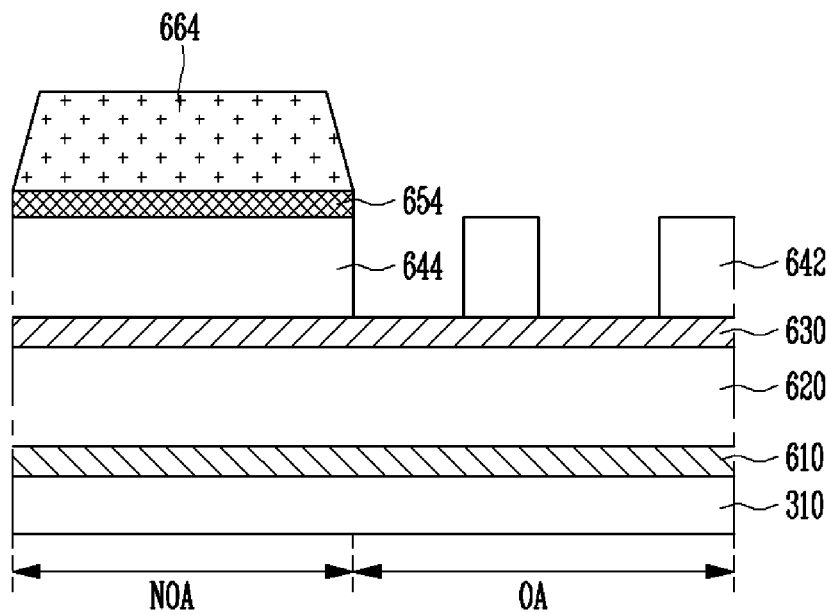
Figure 4E:
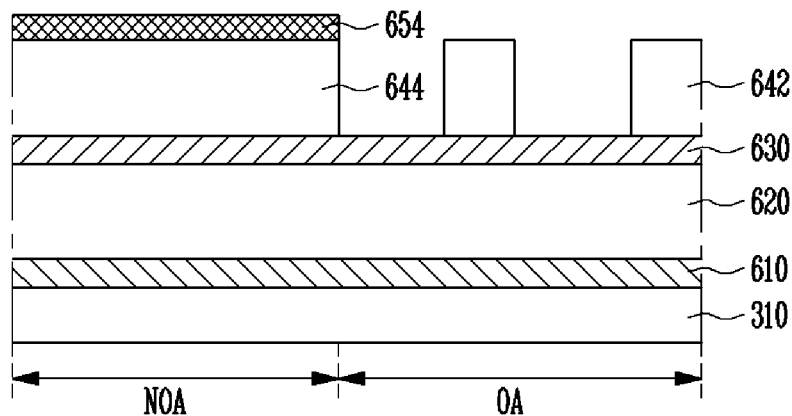
Figure 4F:
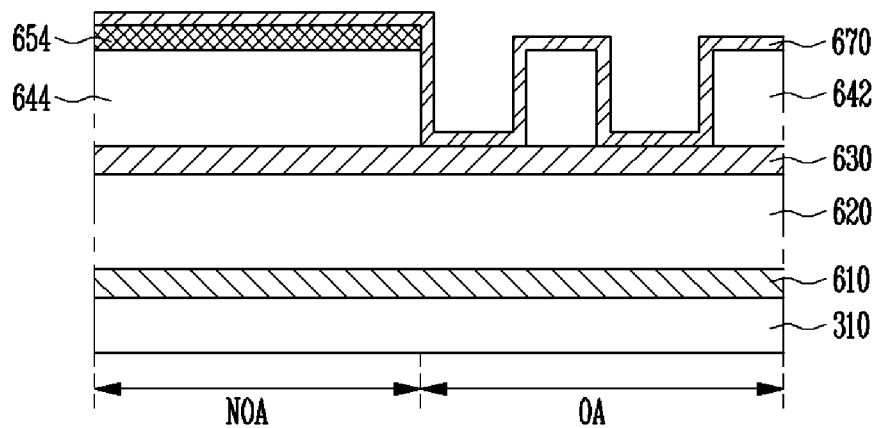
Figure 4G:
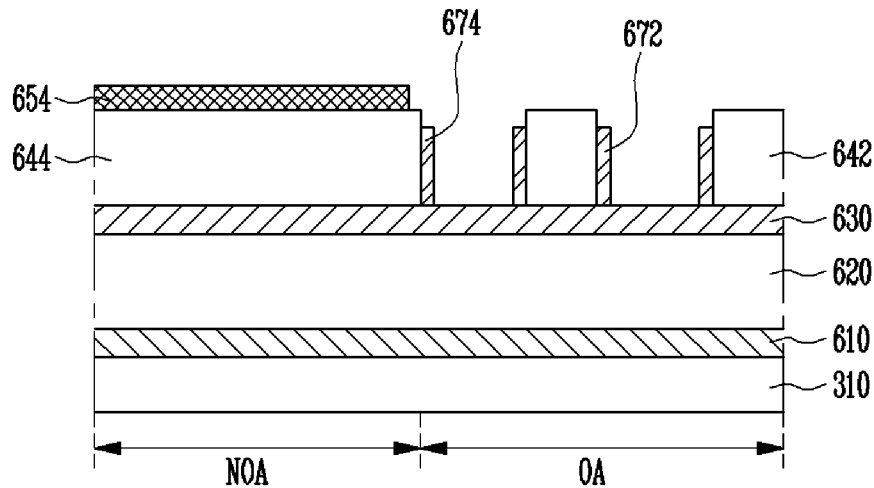
Figure 4H:
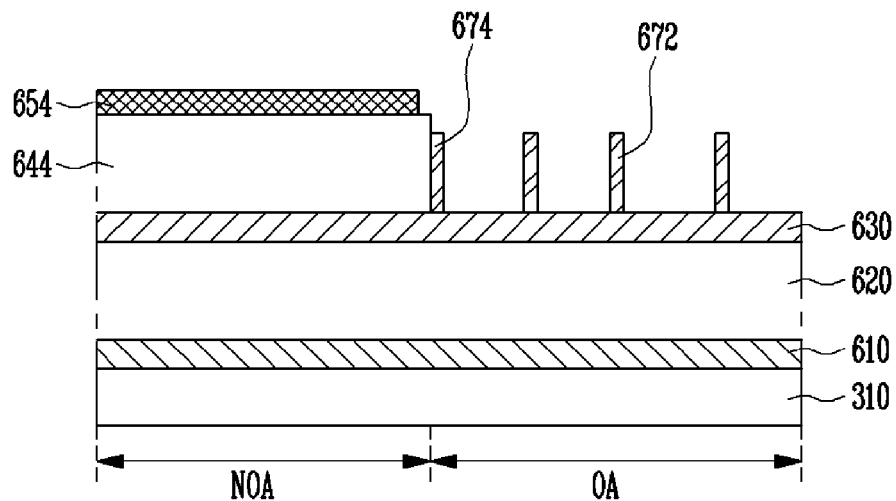
Figure 4I:
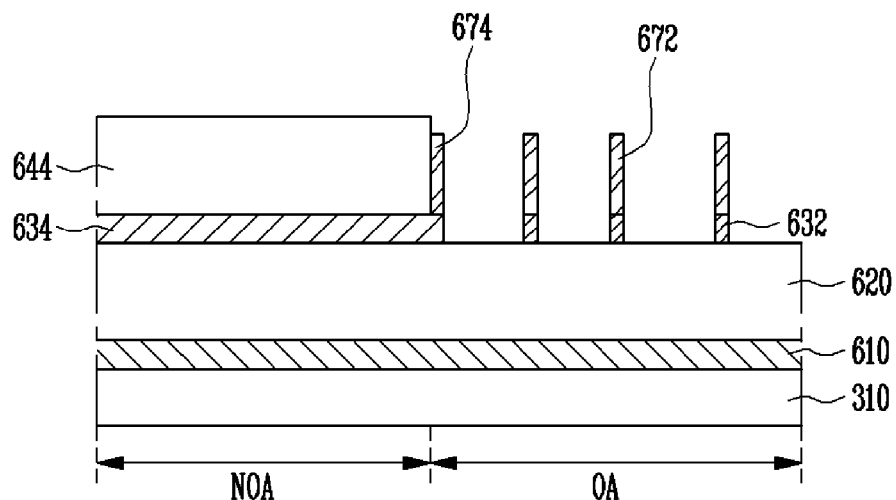
Figure 4J:
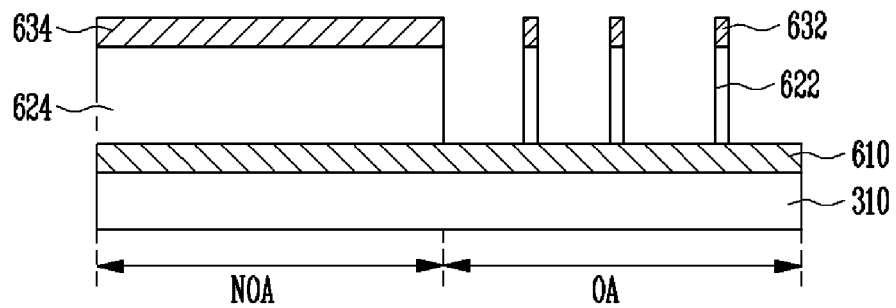
Figure 4K:
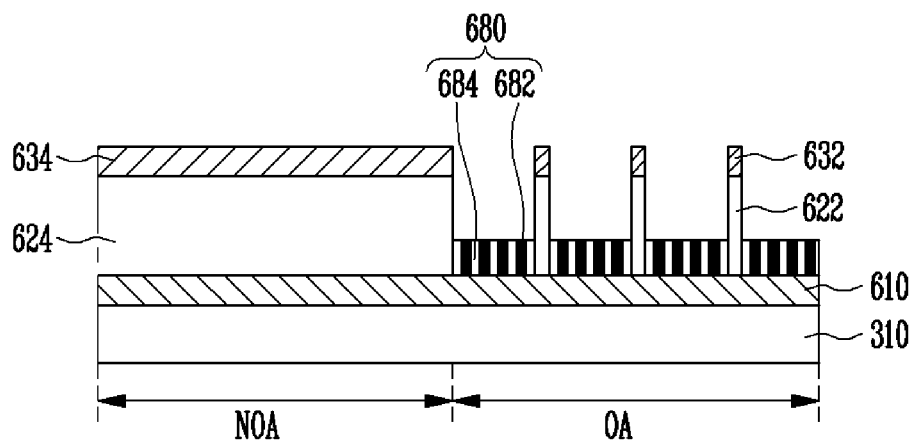
Figure 4L:
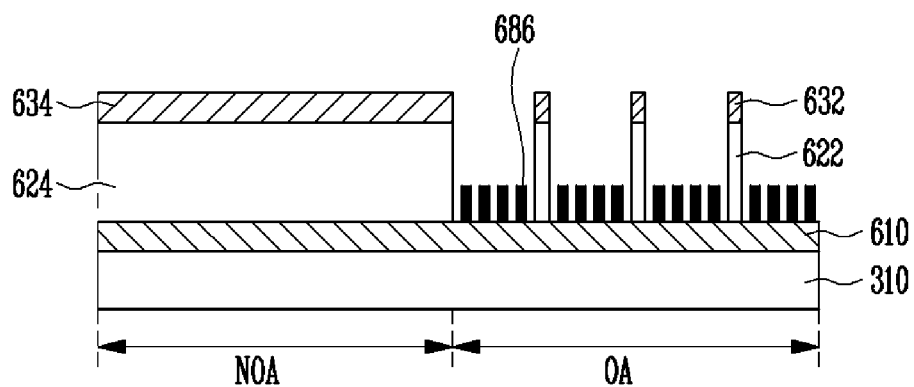
Figure 4M:
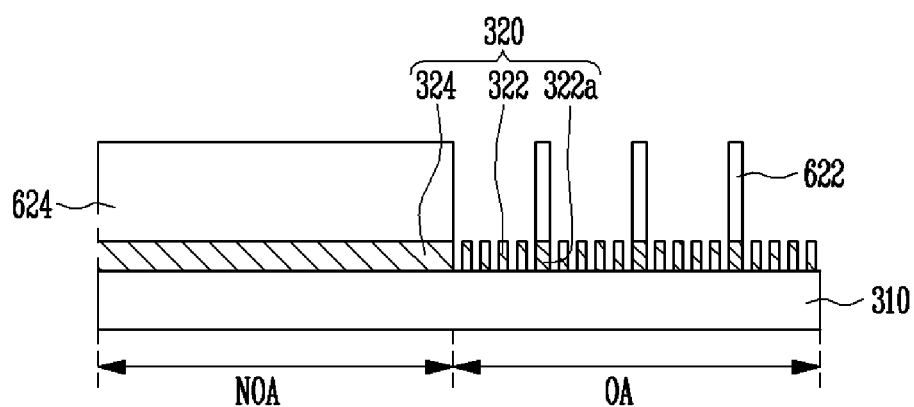
Figure 4N:
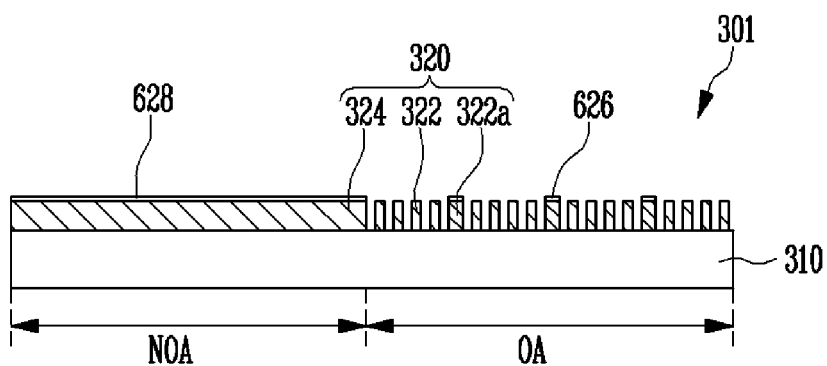

FIGS. 4A to 4N are sectional views sequentially illustrating a method of manufacturing a reflective polarizer plate according to an exemplary embodiment of the invention.

First, as shown in FIG. 4A, after a metal layer 610, a first barrier layer 620, a first hard mask layer 630, a sacrificial layer 640 and a second hard mask layer 650 are sequentially disposed on a surface of the first substrate 310 defining the opening area OA and the non-opening area NOA, a photo mask 660 is disposed on the second hard mask layer 650.

In another exemplary embodiment, the first and/or the second hard mask layer 630 and 650 may be omitted. In an exemplary embodiment, a capping layer (not shown) may be further disposed on the metal layer 610 prior to providing the first barrier layer 620. In an exemplary embodiment, the capping layer may include titanium (Ti) or molybdenum (Mo), for example.

The metal layer 610 is intended to provide the nano wire patterns 322 and the metal film 324 shown in FIG. 3, and provides the wire grid polarizer 320 after being subjected to patterning through a patterning process. In an exemplary embodiment, the metal layer 610 may include aluminum (Al), gold (Au), chromium (Cr), silver (Ag), copper (Cu), nickel (Ni), iron (Fe), and cobalt (Co), or an alloy thereof.

The first barrier layer 620, the first hard mask layer 630, the sacrificial layer 640, the second hard mask layer 650 and the photo mask 660 serve to provide a mask for patterning the metal layer 610 providing the nano wire patterns 322 and the metal film 324 of FIG. 3. Particularly, the first barrier layer 620, the first hard mask layer 630, the sacrificial layer 640, the second hard mask layer 650 and the photo mask 660 are disposed in a multilayer film to enable the providing of a thin and uniform barrier for providing the nano wire patterns 322 each having a substantially small width in a submicron unit, for example, a width of about 200 nm or less in the opening area OA.

However, in the exemplary embodiment of the invention, the metal layer 610 may be patterned to provide the nano wire patterns 322 (see, FIG. 3) having a substantially small width on the opening area OA in the subsequent patterning process, and may be provided as the closed plane metal film 324 (see, FIG. 3) for the non-opening area NOA.

To this end, in the process for patterning the metal layer 610, the opening area OA and the non-opening area NOA may be separated from each other. Particularly, while the patterning process is performed for the metal layer 610, the first barrier layer 620 may be intactly maintained above the metal layer 610 of the non-opening area NOA without being subjected to patterning, thus preventing the metal layer 610 of the non-opening area NOA from being etched.

To this end, in the exemplary embodiment of the invention, photo masks 660 having different thicknesses are respectively disposed on the opening area OA and the non-opening area NOA.

To be more specific, according to the exemplary embodiment of the invention, a plurality of first photo mask patterns 662 is disposed on a sacrificial layer 640 (optionally, on the second hard mask layer 650 provided above the sacrificial layer 640) of each opening area OA to be spaced apart from each other while having a predetermined width and a first height h1, and a second photo mask pattern 664, having a second height h2 that is greater than the first height h1, is disposed on the sacrificial layer 640 (optionally, on the second hard mask layer 650 provided above the sacrificial layer 640) of the non-opening area NOA.

In this regard, the second photo mask pattern 664 may be provided to have a width corresponding to the associated non-opening area NOA. Here, the width may be taken along a horizontal direction in a cross section. In an exemplary embodiment, the second photo mask pattern 664 may be provided to have a width that is similar to or approximately equal to that of the non-opening area NOA so as to cover the associated non-opening area NOA.

As such, when the second photo mask pattern 664 is provided to have a width corresponding to that of the associated non-opening area NOA, the metal layer 610 of the non-opening area NOA is provided to have a width corresponding to the second photo mask pattern 664 in the subsequent patterning process for the metal layer 610. Thereby, the closed plane metal film 324 is disposed in the non-opening area NOA as shown in FIG. 3.

The first and second heights h1 and h2 of the photo mask 660 may be experimentally determined to allow the metal layer 610 to be subjected to patterning, separately on the opening area OA and the non-opening area NOA.

To be more specific, a difference between the first height h1 and the second height h2 may be determined such that at least part of the second photo mask pattern 664 having the second height h2 remains after a process of etching and removing the first photo mask patterns 662 having the first height h1 has been performed.

In order to perform patterning on the first and second photo mask patterns 662 and 664 in different height, a single mask process using a half-tone mask or a slit mask may be used in an exemplary embodiment. Thus, it is advantageous in that the metal layer 610 can be finally subjected to patterning, separately on the opening area OA and the non-opening area NOA through the single mask process using the half-tone mask or the slit mask.

As such, when the photo mask patterns of different height h1 and h2 are provided, separately, on the opening area OA and the non-opening area NOA, it is possible to effectively prevent the metal layer 610 of the non-opening area NOA from being etched without providing an additional etch stopper on the metal layer 610 of the non-opening area NOA. Therefore, it is possible to intactly provide the reflecting part for increasing reflection efficiency by the plane metal film 324 of FIG. 3 on each non-opening area NOA while reducing the number of masks.

The second hard mask layer 650 may be disposed under the photo mask 660 so as to prevent a patterning error of a lower layer, which may be generated in the patterning process, due to the process variation of the photo mask 660. To this end, the second hard mask layer 650 may include a relatively harder material as compared to a photo resist of a soft material, for example. However, the invention is not limited to the exemplary embodiment where the second hard mask layer 650 is necessarily provided, and the second hard mask layer 650 may be omitted in another exemplary embodiment.

Next, as shown in FIG. 4B, the sacrificial layer 640 of the opening area OA is selectively etched using the first and second photo mask patterns 662 and 664 as the mask, so that it is possible to provide a plurality of sacrificial layer patterns 642 and 644.

To be more specific, it is possible to provide the second hard mask patterns 652 and 654 and the sacrificial layer patterns 642 and 644 by etching portions of the second hard mask layer 650 and the sacrificial layer 640, which are not masked by the photo mask 660, in the opening area OA. In an exemplary embodiment, the portions of the second hard mask layer 650 and the sacrificial layer 640, on which the photo mask 660 is not disposed, may be removed by a dry etching method.

In this regard, the second hard mask patterns 652 and the sacrificial layer patterns 642 remaining on the opening area OA may be subjected to patterning to have a narrower width, as compared to the second hard mask patterns 654 and the sacrificial layer patterns 644 remaining on the non-opening area NOA.

Subsequently, as shown in FIG. 4C, the first photo mask patterns 662 on the opening area OA are removed. In this case, only some of the upper portions of the second photo mask patterns 664 on the non-opening area NOA are removed, so that the patterns remain on the non-opening area NOA with their heights being merely lowered. That is, when the first photo mask patterns 662 are removed, the second photo mask pattern 664 is only partially removed.

Thereafter, as shown in FIG. 4D, the second hard mask patterns 652 on the opening area OA are removed by etching. However, the second hard mask patterns 654 on the non-opening area NOA are prevented from being etched, due to the second photo mask patterns 664 remaining above the second hard mask patterns 654, so that the second hard mask patterns 654 remain on the non-opening area NOA.

Subsequently, as shown in FIG. 4E, the second photo mask patterns 664 remaining on the non-opening area NOA are removed by etching, so that the photo mask 660 is fully removed. The upper portion of the sacrificial layer pattern 644 of the non-opening area NOA is masked by the second hard mask patterns 654 remaining on the non-opening area NOA. In another exemplary embodiment, when the second hard mask 650 is not provided, some of the second photo mask patterns 664 remain in place of the second hard mask pattern 654, so that it is possible to mask the upper portion of the sacrificial layer patterns 644 of the non-opening area NOA.

Thereafter, as shown in FIG. 4F, a second barrier layer 670 is disposed on the first substrate 310 on which the sacrificial layer patterns 642 and 644 are disposed, so as to cover whole portions of the opening area OA and the non-opening area NOA in a plan view.

In this regard, the second barrier layer 670 is provided to cover the upper portion of the first hard mask layer 630 exposed between the sacrificial layer patterns 642 while entirely covering the upper portions and sidewalls of the sacrificial layer patterns 642 in the opening area OA, and is provided to cover the second hard mask pattern 654 above the sacrificial layer patterns 644 in the non-opening area NOA. When the second hard mask layer 650 is omitted, the second barrier layer 670 may be provided to cover the upper portions of the second photo mask patterns 664 remaining in the non-opening area NOA.

Subsequently, as the second barrier layer 670 is subjected to anisotropic etching, as shown in FIG. 4G, the first barriers 672 and 674 are provided to be disposed along the sidewalls of the sacrificial layer patterns 642 and 644.

That is, the anisotropic etching may be performed to remove a portion of the second barrier layer 670 which is parallel to the front of the first substrate 310, and to leave a portion of the second barrier layer 670 which is perpendicular to the above-mentioned front.

Thus, the first barriers 672 and 674 may be provided along the sidewalls of the sacrificial layer patterns 642 and 644.

By such anisotropic etching, the first barrier 674, arranged along the sidewall of the sacrificial layer pattern 644 on the non-opening area NOA, is disposed on a boundary between the opening area OA and the non-opening area NOA. Further, in the opening area OA, a plurality of first barriers 672 is arranged along the sidewalls of the sacrificial layer patterns 642 on the opening area OA in such a way as to be spaced apart from each other.

Subsequently, as shown in FIG. 4H, only the sacrificial layer patterns 642 on the opening area OA are selectively removed through the etching process. Then, in the opening area OA, only the first barriers 672 arranged to be spaced apart from each other may be disposed on the first hard mask layer 630.

The first barriers 672 may be provided to have a width substantially smaller than that of the sacrificial layer patterns 642. In an exemplary embodiment, the width of each first barrier 672 may be set to be in a range from about 80 nm to about 200 nm. As such, when the width of the first barrier 672 is provided to be substantially small, it is advantageously possible to finely control the patterning width of the metal layer 610, when the metal layer 610 undergoes patterning in the subsequent process.

In the process of removing the sacrificial layer patterns 642 on the opening area OA, the sacrificial layer patterns 644 on the non-opening area NOA are masked by the second hard mask pattern 654 (optionally, by the second photo mask pattern 664) provided thereabove so as not to be etched.

Subsequently, as shown in FIG. 4I, the first hard mask layer 630 on the opening area OA is etched using the first barriers 672 as the mask, thus providing second barriers 632, and then the second hard mask pattern 654 on the non-opening area NOA is removed by etching.

In this regard, the first hard mask layer 630 on the non-opening area NOA remains in the planar pattern 634 which is not etched.

Since such a first hard mask layer 630 is provided, the first barrier layer 620 can be advantageously etched in a more uniform pattern in the subsequent processing step. However, in another exemplary embodiment, the step of providing and patterning the first hard mask layer 630 may be omitted depending on design conditions.

Subsequently, as shown in FIG. 4J, the first barriers 672 and the second sacrificial layer patterns 644 on the opening area OA and the non-opening area NOA are removed, and in addition, the first barrier layer 620 is etched using the second barriers 632 as the mask, thus providing third barriers 622 on the opening area OA. The third barriers 622 are provided to correspond to positions where the second barriers 632 are provided.

In this regard, since the first hard mask layer 630 on the non-opening area NOA remains in a non-etched planar pattern 634, the first barrier layer 620 on the non-opening area NOA remains in a non-etched planar pattern 624.

In other words, thin third barriers 622 arranged to be spaced apart from each other are disposed in the opening area OA, and the planar first barrier pattern 624 corresponding to the width of the non-opening area NOA is disposed in the non-opening area NOA.

The second and third barriers 632 and 622 are disposed under the first barriers 672 to correspond to the first barriers 672 that have been provided in the previous process, and the process of providing at least one of the first to third barriers 672, 632 and 622 may be omitted.

However, according to the exemplary embodiment, a plurality of barriers 622, 632 and 672 is provided through several steps of the barrier providing process, in place of simply providing only the first barriers 672 and performing patterning on the metal layer 610. Thereby, this compensates a problem where the barriers are asymmetrically provided due to a restriction on dry etching, so that it is possible to advantageously provide the barriers used as the mask in patterning the metal layer 610, for example, the third barriers 622 provided symmetrically and uniformly. However, the invention is not necessarily limited to the above configuration, but some of processes for providing the first to third barriers 622, 632, and 672 may be omitted depending on design conditions.

Subsequently, as shown in FIG. 4K, after a copolymer layer 680 is filled in space between the third barriers 622 and then thermally treated, the copolymer layer 680 is phase-separated into first and second polymers 682 and 684. The copolymer layer 680 serves to provide fine grid patterns of a nano size, and the space between the third barriers 622 may be defined as a grid pattern area. Since the third barriers 622 are provided using the first barriers 672, such a grid pattern area corresponds to the space between the first barriers 672 that have been provided in the previous process.

In this regard, the copolymer layer 680 may be provided to be lower in height than each of the third barriers 622 in the grid pattern area. In an exemplary embodiment, a sum of the heights of the second and third barriers 632 and 622 is 2.5 times or more as high as that of the copolymer layer 680, thus preventing the copolymer layer 680 from overflowing and improving alignment.

Before the thermal treatment, the first and second polymers 682 and 684 of the copolymer layer 680 are irregularly placed in a disorder direction. Through the thermal treatment, the copolymer layer 680 is phase-separated into the first and second polymers 682 and 684.

Particularly, the first and second polymers 682 and 684 are separated to be alternately arranged between adjacent third barriers 622.

In an exemplary embodiment, the first and second polymers 682 and 684 may be polystyrene ("PS") or polymethylmethacrylate ("PMMA"), for example.

Subsequently, as shown in FIG. 4L, when either of the first and second polymers 682 and 684 is removed, only one kind of polymer remains between the third barriers 622 in such a way as to be spaced apart from each other by a predetermined distance, thus providing grid patterns 686. Since the first and second polymers 682 and 684 can be phase-separated from each other to have a substantially small distance therebetween, it is possible to provide the grid patterns 686 having a substantially small width, for example, the width from 50 nm to 60 nm using the copolymer layer 680.

Subsequently, the second barriers 632 and the first hard mask pattern 634 are removed, and in addition, the metal layer 610 is etched using the third barriers 622 and the grid patterns 686 as the mask.

Then, as shown in FIG. 4M, the wire grid polarizer 320 including the polarizing part and the reflecting part is provided, the polarizing part includes nano wire patterns 322 provided in the opening area OA on the first substrate 310, and the reflecting part includes the closed metal film 324 disposed on the non-opening area NOA.

In the case of the grid patterns 686 used as the mask for patterning the nano wire patterns 322, the grid patterns 686 may have a substantially small width from about 50 nm to about 60 nm, for example. Thus, the nano wire patterns 322 disposed under the grid patterns 686 may have a substantially small width corresponding to the grid patterns 686, for example, the width from about 50 nm to about 60 nm. The grid patterns 686 may be removed after the nano wire patterns 322 undergo patterning.

The third barriers 622 may be relatively wider than the grid patterns 686 because of restriction on thickness in the barrier providing process. Thereby, the nano wire patterns 322a disposed under the third barriers 622 may have a different width from that of the nano wire patterns 322 between the third barriers 622.

However, according to the exemplary embodiment of the invention, the third barriers 622 are also provided in relatively fine patterns to have the width from about 80 nm to about 200 nm, for example. Thus, the nano wire patterns 322a located under the third barriers 622 may also be provided to have the width of about 200 nm or less. In this regard, the lower limit of the width may be set in view of restriction on the process, while the upper limit may be set in view of polarization properties. But, the lower and upper limits of the width may be changed variously depending on design conditions.

Thus, according to the exemplary embodiment of the invention, the nano wire patterns 322 are subjected to fine patterning to have the width of approximately 200 nm or less, thus providing the reflective polarizer plate having excellent polarization properties.

Subsequently, the third barriers 622 and the first barrier layer pattern 624 above the wire grid polarizer 320 that has undergone patterning are removed by etching, so that it is possible to manufacture the reflective polarizer plate 301, as shown in FIG. 4N.

In the step of etching the third barriers 622 and the first barrier layer pattern 624, the etching process may be controlled to prevent the wire grid polarizer 320 from being damaged. In this case, the third barriers 622 and the first barrier layer pattern 624 may not be completely removed but some of the third barriers 622 and the first barrier layer pattern 624 may remain above the wire grid polarizer 320 in the form of a thin film.

The residues 628 may remain on the metal film 324 of the non-opening area NOA in the form of a thin film. In the case of the opening area OA, the residues 626 may be on only some of the nano wire patterns 322a.

In an exemplary embodiment, when the first barrier layer 620 includes silicon nitride (SiNx) and the third barriers 622 and the first barrier layer pattern 624 are provided by performing patterning on the first barrier layer 620, a thin silicon nitride film may be disposed on the metal film 324 of the non-opening area NOA and/or some of the nano wire patterns 322a of the opening area OA, for example.

As described above, according to the exemplary embodiment of the invention, the wire grid polarizer 320 is subjected to patterning to provide the polarizing part and the reflecting part on the opening area OA and the non-opening area NOA, respectively, so that it is possible to provide the reflective polarizer plate 301 having improved reflection efficiency while offering sufficient polarization properties.

Particularly, according to the exemplary embodiment of the invention, when manufacturing the reflective polarizer plate 301, the photo masks 660 of different thickness are respectively provided on the opening area OA and the non-opening area NOA. Consequently, it is possible to pattern the wire grid polarizer 320, separately, on the opening area OA and the non-opening area NOA through the single mask process.

Therefore, the invention is advantageous in that it is possible to reduce the number of masks used in the manufacturing process of the reflective polarizer plate 301, in addition to improving the reflection efficiency of the reflective polarizer plate 301.

By way of summation and review, the reflective polarizer plate can be manufactured using the wire grid polarizer. Such a reflective polarizer plate is more resistant to deterioration as compared to the absorption-type polarizer plate in a film form, and can be integrated with the display panel or the like in an In-Cell type. Thus, the reflective polarizer plate may be applied to various kinds of display devices including a liquid crystal display device, and its application scope is being gradually extended.

According to the exemplary embodiment of the invention, the polarizing part and the reflecting part are provided, respectively, on the opening area and the non-opening area, separately, thus achieving the reflective polarizer plate having improved reflection efficiency as well as sufficient polarization properties.

Further, according to the exemplary embodiment of the invention, when manufacturing the reflective polarizer plate, the photo masks of different heights are provided, separately, on the opening area and the non-opening area. As a result, it is possible to pattern the wire grid polarizer, separately, on the separated opening area and non-opening area through the single mask process.

Therefore, the invention is advantageous in that it is possible to reduce the number of masks used in the manufacturing process of the reflective polarizer plate, in addition to improving the reflection efficiency of the reflective polarizer plate.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A method of manufacturing a reflective polarizer plate comprising:
    sequentially disposing a metal layer, a first barrier layer and a sacrificial layer on a substrate defining an opening area and a non-opening area;
    providing a plurality of first photo mask patterns, each having a first height and spaced apart from each other, on the sacrificial layer of the opening area, and providing a second photo mask pattern on the sacrificial layer of the non-opening area, the second photo mask pattern having a second height which is greater than the first height;
    providing a plurality of sacrificial layer patterns by selectively etching the sacrificial layer of the opening area using the plurality of first photo mask patterns and the second photo mask pattern as a mask;
    removing the plurality of first photo mask patterns, and removing only a portion of the second photo mask pattern;
    disposing a second barrier layer on the substrate on which the plurality of sacrificial layer patterns is provided;
    providing a plurality of first barriers disposed along sidewalls of the plurality of sacrificial layer patterns by anisotropically etching the second barrier layer;
    selectively removing only the plurality of sacrificial layer patterns of the opening area;
    providing a plurality of grid patterns spaced apart from each other, by providing a copolymer layer in a grid pattern area corresponding to a space between the plurality of first barriers and then performing patterning; and
    providing a wire grid polarizer having a plurality of nano wire patterns arranged in the opening area to be spaced apart from each other, and a metal film in the non-opening area, by performing patterning on the metal layer of the opening area using the plurality of grid patterns.

2. The method as claimed in claim 1, wherein the second photo mask pattern has a width corresponding to an associated non-opening area.

3. The method as claimed in claim 2, wherein the metal film is provided in a closed type to have a width corresponding to the second photo mask pattern.

4. The method as claimed in claim 1, wherein, in the providing the plurality of first photo mask patterns and the second photo mask pattern, the plurality of first photo mask patterns and the second photo mask pattern are provided through a single mask process using a half-tone mask or a slit mask.

5. The method as claimed in claim 1, wherein the providing the metal layer, the first barrier layer and the sacrificial layer further comprises at least one of:
   providing a first hard mask layer between the first barrier layer and the sacrificial layer; and
   providing a second hard mask layer on the sacrificial layer.

6. The method as claimed in claim 5, further comprising:
   providing second hard mask patterns by selectively etching the second hard mask layer of the opening area using the plurality of first mask patterns and the second photo mask pattern, before providing the plurality of sacrificial layer patterns.

7. The method as claimed in claim 6, further comprising:
   between the removing the plurality of first photo mask patterns and the portion of the second photo mask pattern and the providing the second barrier layer,
   removing the second hard mask patterns of the opening area; and
   removing the second photo mask pattern which remains on the non-opening area,
   wherein the second barrier layer is provided to cover the second hard mask pattern remaining on the plurality of sacrificial layer pattern of the non-opening area and the plurality of sacrificial layer patterns of the opening area.

8. The method as claimed in claim 7, wherein, in the selectively removing the plurality of sacrificial layer patterns of the opening area, upper portions of the plurality of sacrificial layer patterns of the non-opening area are masked by the second hard mask pattern.

9. The method as claimed in claim 5, further comprising:
   between the providing the plurality of first barriers and the providing the plurality of grid patterns,
   providing second barriers by performing patterning on the first hard mask layer using the plurality of first barriers as the mask; and
   providing third barriers by performing patterning on the first barrier layer using the second barriers as the mask.

10. The method as claimed in claim 9, wherein the providing the plurality of grid patterns comprises:
    filling the copolymer layer between the third barriers to a height which is lower than the third barriers;
    phase-separating the copolymer layer into first and second polymers by thermally treating the copolymer layer such that the first and second polymers are alternately arranged; and
    providing the plurality of grid patterns spaced apart from each other by a predetermined distance, between the third barriers, by removing either of the first and second polymers.

11. The method as claimed in claim 9, wherein, in the providing the wire grid polarizer, the metal layer of the opening area is subjected to patterning, using the plurality of grid patterns as well as the third barriers, as the mask.

12. The method as claimed in claim 1, wherein the plurality of nano wire patterns is subjected to patterning to have a width of about 200 nanometers or less.

13. The method as claimed in claim 12, wherein at least one of the plurality of nano wire patterns is subjected to patterning to have a width ranging from about 50 nanometers to about 60 nanometers.

* * * * *